United States Patent [19]

Suzuki

[11] Patent Number: 4,651,279
[45] Date of Patent: Mar. 17, 1987

[54] INFORMATION RECORDING SYSTEM WITH MULTIPLE LEVELS OF DATA ACCESS

[75] Inventor: Yasuo Suzuki, Nagaokakyo, Japan

[73] Assignee: Omron Tateisi Electronics Co., Kyoto, Japan

[21] Appl. No.: 556,198

[22] Filed: Nov. 29, 1983

[30] Foreign Application Priority Data

Dec. 1, 1982 [JP] Japan .................................. 57-211556

[51] Int. Cl.⁴ .......................... G07G 1/12; G06M 3/08
[52] U.S. Cl. ................................ 364/405; 340/825.31; 377/13
[58] Field of Search ....................... 364/405, 406, 404; 340/825.31; 371/13

[56] References Cited

U.S. PATENT DOCUMENTS

| | | | |
|---|---|---|---|
| 4,114,139 | 9/1978 | Boyd et al. ..................... | 340/825.31 |
| 4,317,172 | 2/1982 | Nakano ................. | 364/405 |
| 4,360,872 | 11/1982 | Suzuki et al. ....................... | 364/405 |
| 4,450,535 | 5/1984 | de Pommery et al. ......... | 364/405 X |
| 4,502,119 | 2/1985 | Tsuzuki ................. | 364/405 |
| 4,503,503 | 3/1985 | Suzuki .............................. | 364/406 X |

FOREIGN PATENT DOCUMENTS

| | | | |
|---|---|---|---|
| EP28127 | 5/1981 | European Pat. Off. ............ | 364/405 |
| 3038399 | 4/1981 | Fed. Rep. of Germany ...... | 364/405 |
| 52-23537 | 3/1978 | Japan .................................. | 364/405 |
| 0152072 | 11/1981 | Japan .................................. | 364/405 |

Primary Examiner—Jerry Smith
Assistant Examiner—Charles B. Meyer
Attorney, Agent, or Firm—Wegner & Bretschneider

[57] ABSTRACT

An information recording system, which comprises means for storing in a storage device various pieces of information to be registered, an operator table storing at least one secret code peculiar to a particular operator and an operation level corresponding to such secret code, and a report weight table storing a plurality of different weights one for each kind of recorded information to be outputted, means for entering a secret code of the operator and the kind of recorded information to be outputted when such recorded information is desired to be outputted, means for comparing the operation level corresponding to the secret code of the operator so entered with the weight of the recorded information desired to be outputted, and means for outputting the recorded information only when the secret code of the operator is greater than the weight of the recorded information.

3 Claims, 10 Drawing Figures

Fig. 7

| 0 | 1 | Report | 0 | 2 | Code |

| 0 0 1 0 | 0 1 |
|---|---|
| 0 0 2 0 | 0 5 |
| 0 1 0 0 | 1 5 |
| 0 3 0 0 | 0 2 |
| | |
| 8 0 0 0 | 9 9 |

| 0 1 | 0 2 |
|---|---|
| 0 2 | 0 3 |
| 0 3 | 5 0 |
| 0 4 | 1 5 |
| 0 5 | 0 1 |
| 0 6 | 0 8 |
| | |
| 9 9 | 1 0 |

Fig. 10

| 0 | 1 | 0 | 0 | Autho. | 0 | 6 | Report |

INFORMATION RECORDING SYSTEM WITH MULTIPLE LEVELS OF DATA ACCESS

BACKGROUND OF THE INVENTION

The present invention generally relates to an information recording device such as, for example, an electronic cash register and, more particularly, to an information recording system for outputting pieces of information recorded in the information recording device, and a method therefor.

An electronic cash register widely used in shops, department stores and like establishments is an effective instrument to record transactions of goods sold and the amounts of money received as a result of such transactions. A certain type of electronic cash register currently available in the market has the capability of outputting recorded pieces of information under a special mode in the form of a report or statement. Examples of the report bearing the information outputted from the electronic cash register include a sales record for each day or for each zone of business hours, an adjustment report bearing a record of business dealings such as discount, correction and/or return of goods once sold, and a price look-up report bearing a record of prices of special goods and the status of sale.

In some of the conventional electronic cash registers of the type referred to above, the report may not be issued to all who have handled the cash register, but to a limited number of persons, such as those of the management, who are assigned a respective secret code. In other words, these conventional cash registers are of such a model that only when the secret code inputted in the cash register coincides with that preset and stored therein, the machine can issue the report in the form of a printed sheet. Each secret code referred to above is something like a key necessary to open the door of an electronic cash register.

On the other hand, information recorded in the conventional electronic cash register has a varying degree of secrecy, and the information of higher secrecy would be one which is to be disclosed only to the management whereas the information of lower secrecy would be one which may be accessible to any operators of the cash register. Accordingly, if the secret code is allocated to all of the operators, some pieces of information of higher secrecy can not be protected against disclosure to person of lower secrecy level.

SUMMARY OF THE INVENTION

Accordingly the present invention has been developed with a view to substantially eliminating the above described disadvantages and inconveniences inherent in the conventional electronic cash registers and has for its essential object to provide a system by which the secrecy of the information contained in the cash register can be protected by allowing the right information to be accessible only to the right person.

According to the present invention, an operator table storing at least one secret code assigned to a particular operator and an operation level corresponding thereto, and a report weight table storing different weights one for each kind of recorded information are stored in a storage means together with various pieces of information to be recorded. When a piece of the recorded information is desired to be outputted, the secret code assigned to the operator and the kind of the recorded information desired to be outputted are entered. The operation level corresponding to the secret code so entered is then compared with the weight of the recorded information desired to be outputted, and the recorded information is outputted only when operation level corresponding to the secret code is greater than the weight of the recorded information.

According to the present invention, if the weights are alloted to pieces of recorded information of different importance, it is possible to limit the number of persons to whom a particular piece of the recorded information can be outputted. Accordingly, the output obtainable from the information recording device can be controlled according to the level of the operator, and the secrecy of the information recorded in the information recording device can be protected.

BRIEF DESCRIPTION OF THE DRAWINGS

These and other objects and features of the present invention will become clear from the subsequent description thereof taken in conjunction with a preferred embodiment thereof with reference to the accompanying drawings, in which:

FIG. 4 is a flow chart showing the sequence of operations which takes place when both an operator table and a report weight table are preset;

FIG. 7 is a diagram similar to FIG. 5, showing an operating procedure to be performed when the report weight table is to be preset;

FIG. 8 is a schematic diagram showing the report weight table;

FIG. 9 is a flow chart showing the sequence of operation which takes place when the report is to be outputted and FIG. 10, is a schematic diagram showing an operating procedure to be performed when the report is to be outputted.

DETAILED DESCRIPTION OF THE EMBODIMENT

Figure 1:
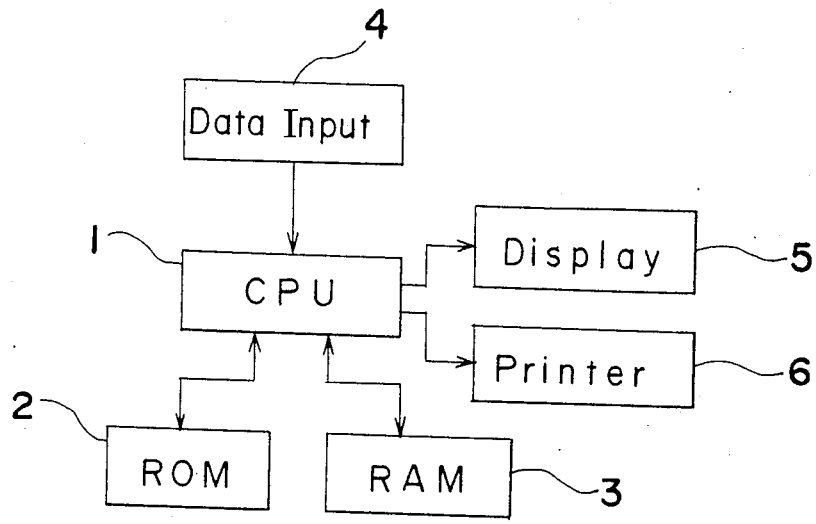
FIG. 1 is a schematic circuit block diagram showing an electronic cash register according to a preferred embodiment of the present invention.

Before the description of the present invention proceeds, it is to be noted that like parts are designated by like reference numerals throughout the accompanying drawings.

Referring to FIG. 1, a central processing unit (CPU)1 is connected with a read-only memory (ROM)2 and also with a storage means such as a random access memory (RAM)3. The ROM 2 stores therein a program necessary to control the sequence of operation of the CPU 1, whereas the RAM 3 stores therein sales information such as the price of each goods, the number of goods sold, the amount of sales and others. The electronic cash register shown in FIG. 1 is manipulated through a data input means 4 such as the keyboard shown in FIG. 2, and while the cash register is operated, calculated values of information being registered or the like are displayed in a display unit 5, and both the information registered and the results of calculation are printed out from a printing unit 6 such as a printer.

Figure 2:
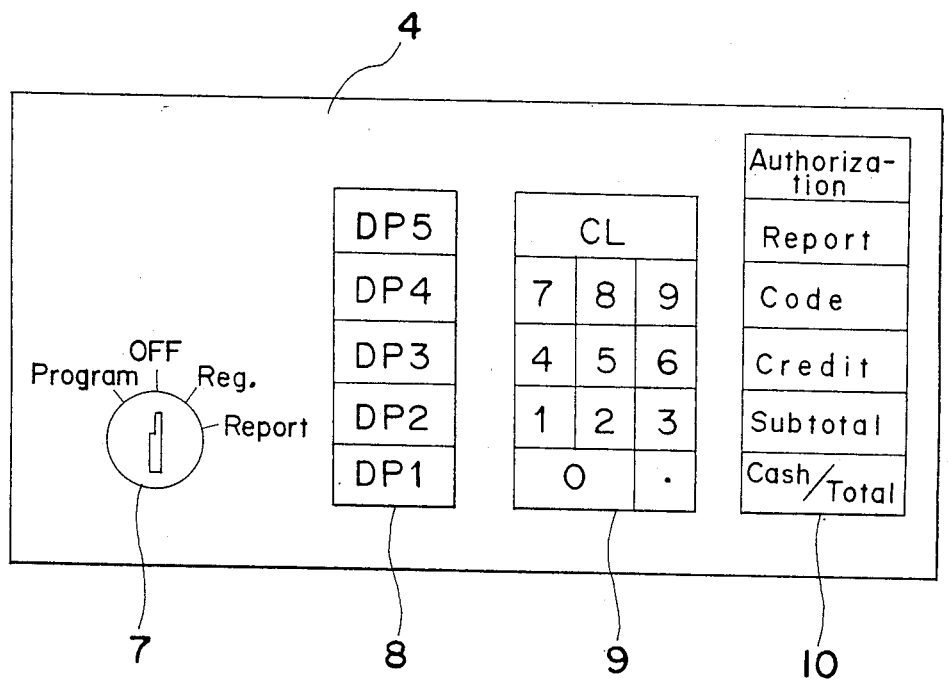
FIG. 2 is a schematic diagram showing a panel area of the keyboard which constitutes a data input means.
Figure 3:
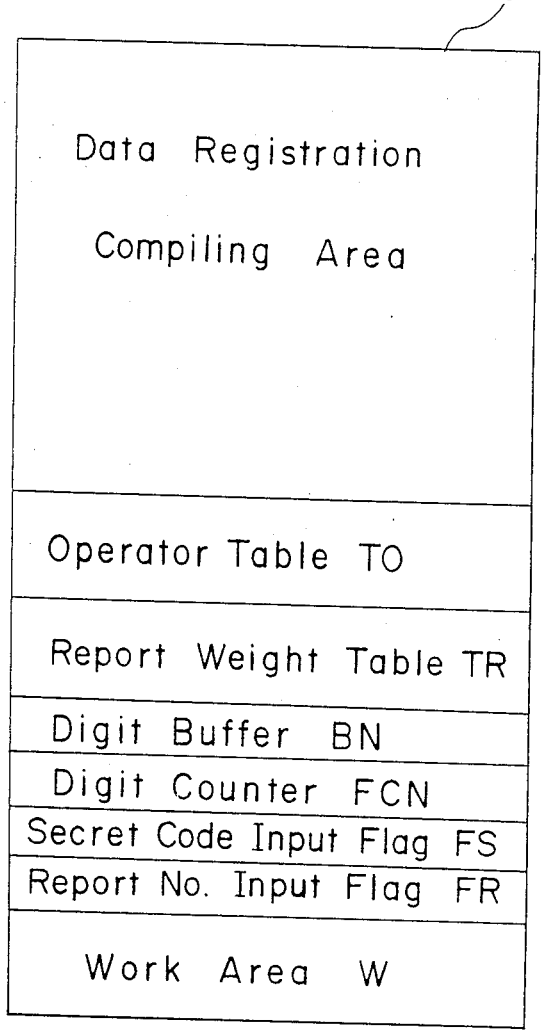
FIG. 3 is a schematic diagram showing a memory map of a random access memory used.

Referring now to FIG. 2 showing a panel portion of the keyboard 4, the keyboard 4 includes a key switch 7 for selecting operating modes of the cash register one at a time, a group of department specifying keys 8 for selecting one of the departments to which an item being sold belongs, a group of numerical input keys 9 for entering a numerical figure such as, for example, the price of an item being sold and various kinds of codes, and a group of function keys 10. A memory map showing the contents stored in the RAM 3 is shown in FIG. 3 and includes, in addition to a compiling area for each department for compiling the data registered, a compiling area for each operator and a function compiling area, an operator table TO for the storage of operators' secret codes and operation levels corresponding thereto, a report weight table TR for the storage of weights corresponding to the degree of secrecy of various reports, a digit buffer BN for the temporary storage of numerical data inputted from the numerical input key or keys 9, a digit counter FCN for counting the number of digits forming the numerical data inputted, a secret code input flag FS for checking the absence or presence of the entry of the secret code, a report number input flag FR for checking the absence or presence of the entry of a report number, and a work area W for the temporary data storage.

Figure 5:
FIG. 5 is a diagram showing an operating procedure to be performed when the operator table is to be preset.
Figure 6:
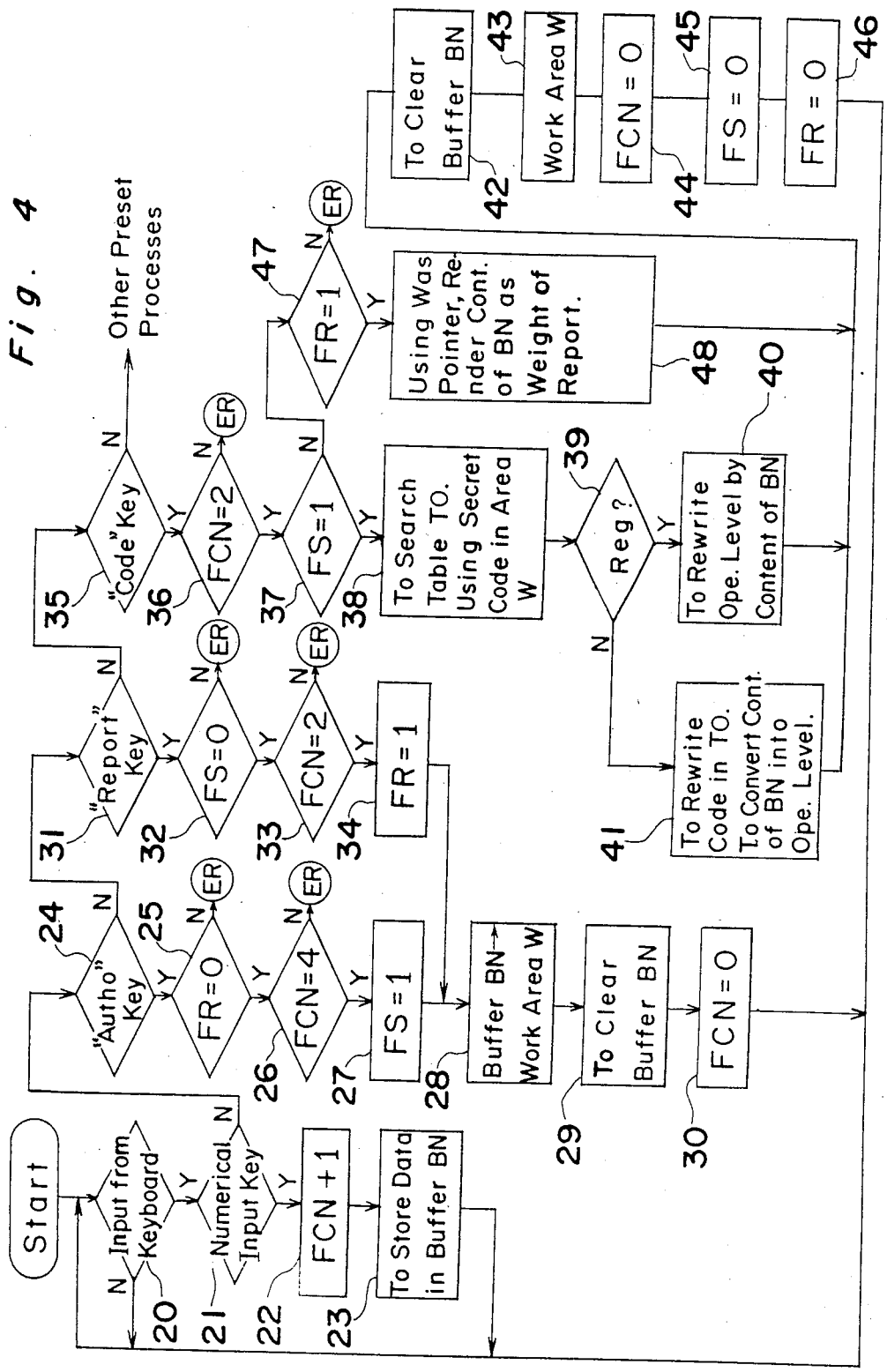
FIG. 6. is a schematic diagram showing an operator table.

The procedure to preset both the operator table TO and the report weight table TR in the electronic cash register according to the present invention will now be described with particular reference to FIG. 4. FIG. 5 illustrates the sequence of procedures necessary to set the operator table TO, and the operator's secret code must be inputted the first thing by manipulating the numerical input keys 9 in the keyboard 4. The secret code is peculiar to each person or operator who is allowed to operate the electronic cash register, and is comprised of a plurality of, for example, four, decimal digits. Assuming that the operator who is about to operate the cash register has been assigned a secret code "0010", and referring now to FIG. 4, the absence or presence of an input from the keyboard is checked at a decision step 20. When the most significant digit "0" of the four-digit secret code has been entered from the keyboard, the step 20 is followed by another decision step at which the group of the key then manipulated is checked. If the result of the decision at the step 21 shows that one of the numerical input keys has been manipulated, the count of the digit counter FCN is incremented by one at a step 22 and data are then stored in the digit buffer BN at the following step 23. The flow of the steps 20 to 23 is repeated until all four digits constituting the operator's secret code are entered in the cash register through the manipulation of the numerical input keys. After the secret code has been entered, the operator should depress an "Authorization" key included in the group of the function keys 10. Once the "Authorization" key (or "Autho" key, in short) has been depressed, the flow proceeds from the step 20 to a decision step 24 through the decision step 21. At the step 24, a check is made as to whether or not the "Autho" key has been depressed, and since the answer is yes in this case, the step 24 is followed by the step 25 at which a check is made as to whether or not the report number input flag FR is zero. If the flag FR is not zero, an error process is performed, but since the flag RR is zero in the instance now under discussion, another decision step 26 is performed to check whether or not the count of the digit counter FCN is four. If the count of the counter FCN is not four, an error process is performed, but since the four digits constituting the secret code have been entered and the count of the counter FCN is therefore four, the secret code input flag FS is set up at a step 27. At the subsequent step 28, the contents of the digit buffer BN are stored in the work area W and, at the following successive steps 29 and 30, the buffer BN and the counter FCN are successively cleared, with the flow consequently returning to the step 20. After the "Autho" key has been depressed, the operation level of the operator giving the secret code has to be entered using the routine of the steps 20 to 23. The operation level referred to above is an index necessary to determine the degree of importance of a report to be outputted and is expressed by a plurality of, for example, two, decimal digits which are "0" and "1" in the instance now under discussion. When the operation level "01" is entered by the manipulation of the numerical input keys 9, the value representing the operation level is retained in the buffer BN. When as the last procedure the "Code" key in the group of the function keys 10 is depressed, the flow proceeds from the step 20 to a decision step 36 through the sequential steps 21, 24, 31 and 35 and the count of the counter FCN is checked as to whether or not it is two. If it is not two, an error process is performed, but since the count of the counter FCN is two in the illustrated instance, whether or not the secret code input flag FS has been set up is checked at the following step 37. Since in the illustrated instance the flag FS has been set up at the step 27, the operator table TO is searched at a step 38, using the secret code retained in the work area W, to determine whether or not the secret code so entered is one of the secret codes registered. If it is determined at the step 39 that the secret code is the one already registered, the operation level corresponding to the secret code is rewritten at a step 40 by the content of the buffer BN, but if it is determined not the one registered, the step 41 is performed to rewrite the secret code of the operator in the operator table TO using the content of the work area W and to convert the content of the buffer into the operation level. Thereafter, the buffer BN, the work area W, the counter FCN, the secret code input flag FS and the report No. input code FR are sequentially reset at respective steps 42 to 46, thereby completing the setting of one operator's secret code and its corresponding operation level. By utilizing the procedures described above, other operators' secret codes and their corresponding operation levels are set to complete such an operator table TO as shown in FIG. 6.

Where the report weight table TR is to be set, the report No. for each report must be inputted by the manipulation of the numerical input keys 9 following the procedure shown in FIG. 7. In this case, the routine of the steps 20 to 23 is repeated to enter the report number, for example, "01", and subsequently, the "Report" key in the group of the function keys 10 has to be depressed. When the "Report" key has actually been depressed, the flow proceeds to a decision step 32 at which a check is made to determine whether or not the secret code input flag FS is zero. If the flag FS is not found to be zero, an error process is performed, but if it is found to be zero, the following decision step 33 is performed to determine if the count of the FCN is two. Since the report number has been described as constituted by the two decimal digits in the illustrated instance and has already been entered, the step 33 is followed by a step at which the report number input flag FR is set up. Thereafter, the step 34 is followed by the step 28, and the flow proceeds then to the step 20 through the sequential steps 28 to 30, thereby completing the two digits for the report No. The report weight herein referred to is the weight of secrecy of the particular report, and the larger the figure represented by the two digits of each report No., the greater the importance of the report. Assuming that "02" is entered through the routine of the sequential steps 20 to 23, and the "Code" key in the group of the function keys 10 is subsequently depressed, the flow proceeds through the sequential steps 20, 21, 24, 31 and 35 to the step 36 at which the count of the counter BN is checked and then to the step 37 at which the secret code input flag FS is checked. Sicne in the illustrated instance the count of the counter FCN is two and the secret code input flag FG is reset, the step 37 is followed by the step 47 at which it is determined whether or not the report No. input flag FR is set. If the result of determination at the step 47 shows that the flag FR is reset, an error process is performed. However, since the flag FR has been set at the step 34 and therifre, the result of determination at the step 47 shows that the flag FR is set, the subsequent step 48 is performed to set the content of the buffer BN in a relevant weight setting area for the report No. on the basis of the report No. stored in the work area W. Thereafter, the step is followed by the step 42 at which the buffer BN is cleared and then by the step 43 at which the work area W is cleared. After the counter FCN has been cleared at the step 44 subsequent to the step 43, the flags FS and FR are sequentially reset at the respective steps 45 and 46 before the flow proceeds back to the step 20. In this way, the different weights of the respective reports are set, thereby completing a report weight table TR such as shown in FIG. 8.

Figure 9:
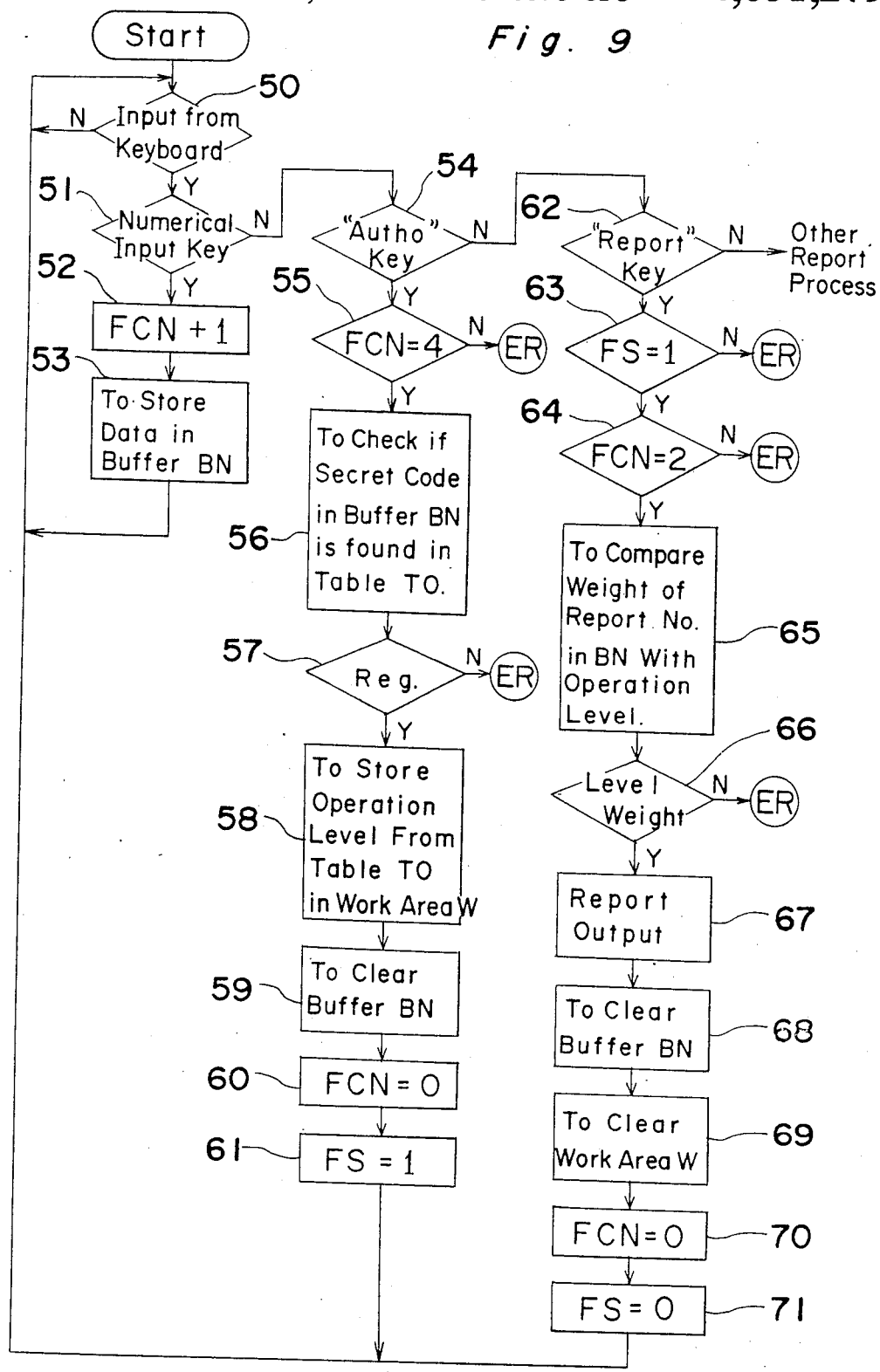

A report outputting operation of the electronic cash register embodying the present invention will now be described with reference to a flow chart shown in FIG. 9. FIG. 10 illustrates the procedure to follow when a report is desired to be outputted or reproduced. In order for the report to be outputted, the first thing the operator must do is switch the key switch 7 over to the position for a report mode. Thereafter, the secret code assigned to such operator must be entered. Assuming that the secret code of the operator who wishes to have the report outputted and is therefore going to operate the electronic cash register is "0100", this secret code must be entered by repeating four times a routine of the steps 50 to 53, similar to the routine of the steps 20 to 23 in the flow chart of FIG. 4, to place data of the secret code in the buffer BN. The next procedure is to depress the "Autho" key in the group of the function keys 10. When the "Autho" key has been depressed, the flow proceeds through the steps 50, 51 and 54 to the step 55 at which it is determined whether or not the count of the counter FCN is four. If it is found not to be four, an error process is performed, but since the four digits constituting the secret code have already been entered, the step 55 is followed by the step 56 during which it is determimed whether or not the secret code is represented by the buffer BN is the one registered in the operator table TO. If at the subsequent decision step 57 the secret code is found not to be the one registered in the table TO, an error process is performed. On the contrary thereto, if the result of determination shows the registration of the secret code in the table TO, the step 58 is performed to read out the operation level of the secret code from the operator table TO and then to store it in the work area W. Thereafter, the buffer BN and the counter FCN are respectively cleared at the steps 59 and 60 and the flag FS is set up at the step 61, and the flow proceeds back to the step 50. After the "Autho" key has been depressed in the manner described above, the number, for example, "06", of the report desired to be outputted should be entered by manipulating the numerical input keys 9, followed by the entry of the "Report" key. When these procedures are carried out, the flow proceeds through the sequential steps 50, 51, 54 and 62 to a decisions step 63 at which it is determined whether or not the flag FS is set. Should the result of determination at the step 63 show the resetting of the flag FS, an error process is performed. However, since the flag FS has already been set up at the step 61, the step 63 is followed by the step 64 at which the count of the counter FCN is checked. Since the two digits forming the number of the report have already been entered and the count of the counter FCN is therefore two, a step 65 takes place subsequent to the step 64 to search the report weight table TR based on the report number specified by the buffer BN, followed by the step 66 during which the weight of the report is compared with the operation level stored in the work area W. If the value of the operation level is smaller than the weight of the report, it means that the report should not be issued to the operator then operating the electronic cash register and, therefore, an error process is performed. On the contrary thereto, if the value of the operation level is equal to or greater than the weight of the report, the report is outputted at the subsequent step 67. Specifically, since the operation level of the operator to whom the secret code of "0100" has been assigned is "15" as shown in FIG. 6 and the weight of the report numbered "06" is "08" as shown in FIG. 8, the outputting of the report is possible in the manner described above. Thereafter, the buffer BN and the work area W are cleared at the respective steps 68 and 69, and the counter FCN and the flag FS are reset at the respective steps 70 and 71. After the step 71, the flow proceeds back to the step 50, thereby completing the report outputing process.

From the foregoing, it has now become clear that it is possible to limit the number of operators for whom a particular report is to be outputted, according to the degree of importance of the report and, therefore, the secrecy of the information contained in the electronic cash register can advantageously be protected.

Although the present invention has fully been described in connection with the specific embodiment thereof with reference to the accompanying drawings, it is to be noted that various changes and modifications are apparent to those skilled in the art from the reading of the disclosure herein made. By way of example, although reference has been made to the electronic cash register in the foregoing description, the present invention may not be always limited thereto, but may be applicable to any other information outputting device.

Therefore, such changes and modifications are to be construed as included within the scope of the present invention as defined by the appended claims, unless they depart therefrom.

What is claimed is:

1. An information recording system comprising:

storage means for storing a plurality of pieces of recorded information, each piece of recorded information having a report number;

operator table means for storing at least one secret code peculiar to a particular operator and an operation level corresponding to each secret code;

report weight table means for storing a plurality of weights, with one weight for each report number;

means for entering a secret code of an operator and the report number of a piece of recorded information to be outputted from said storage means;

means for comparing the operation level corresponding to the secret code of the operator with the weight corresponding to the report number of the piece of recorded information to be outputted; and means responsive to the comparing means for outputting the piece of recorded information from the storage means only when the operation level corresponding to the secret code of the operator is equal to or greater than the weight corresponding to the report number of the piece of recorded information to be outputted.

2. A system as claimed in claim 1, wherein said information recording system is an electronic cash register.

3. An information outputting method for an information recording device, which comprises the steps of:

storing in a storage means various pieces of information to be registered, with an operator table storing at least one secret code peculiar to a particular operator and an operation level corresponding to such secret code, and with a report weight table storing a plurality of different weights, one for each kind of recorded information to be outputted;

entering a secret code of the operator and the kind of recorded information to be outputted when such recorded information is desired to be outputted;

comparing the operation level corresponding to the secret code of the operator so entered with the weight of the recorded information desired to be outputted; and outputting the recorded information only when the secret code of the operator is greater than the weight of the recorded information.

* * * * *